July 10, 1923.

Re. 15,644

J. N. REYNOLDS

LINE SWITCH

Original Filed Oct. 26, 1916

3 Sheets-Sheet 1

Inventor:
John Newberry Reynolds
by J. E. Roberts Att'y.

July 10, 1923.

Re. 15,644

J. N. REYNOLDS

LINE SWITCH

Original Filed Oct. 26, 1916

3 Sheets-Sheet 2

Inventor:
John Newberry Reynolds,
by J. E. Roberts Att'y

July 10, 1923.
Re. 15,644
J. N. REYNOLDS
LINE SWITCH
Original Filed Oct. 26, 1916
3 Sheets-Sheet 3
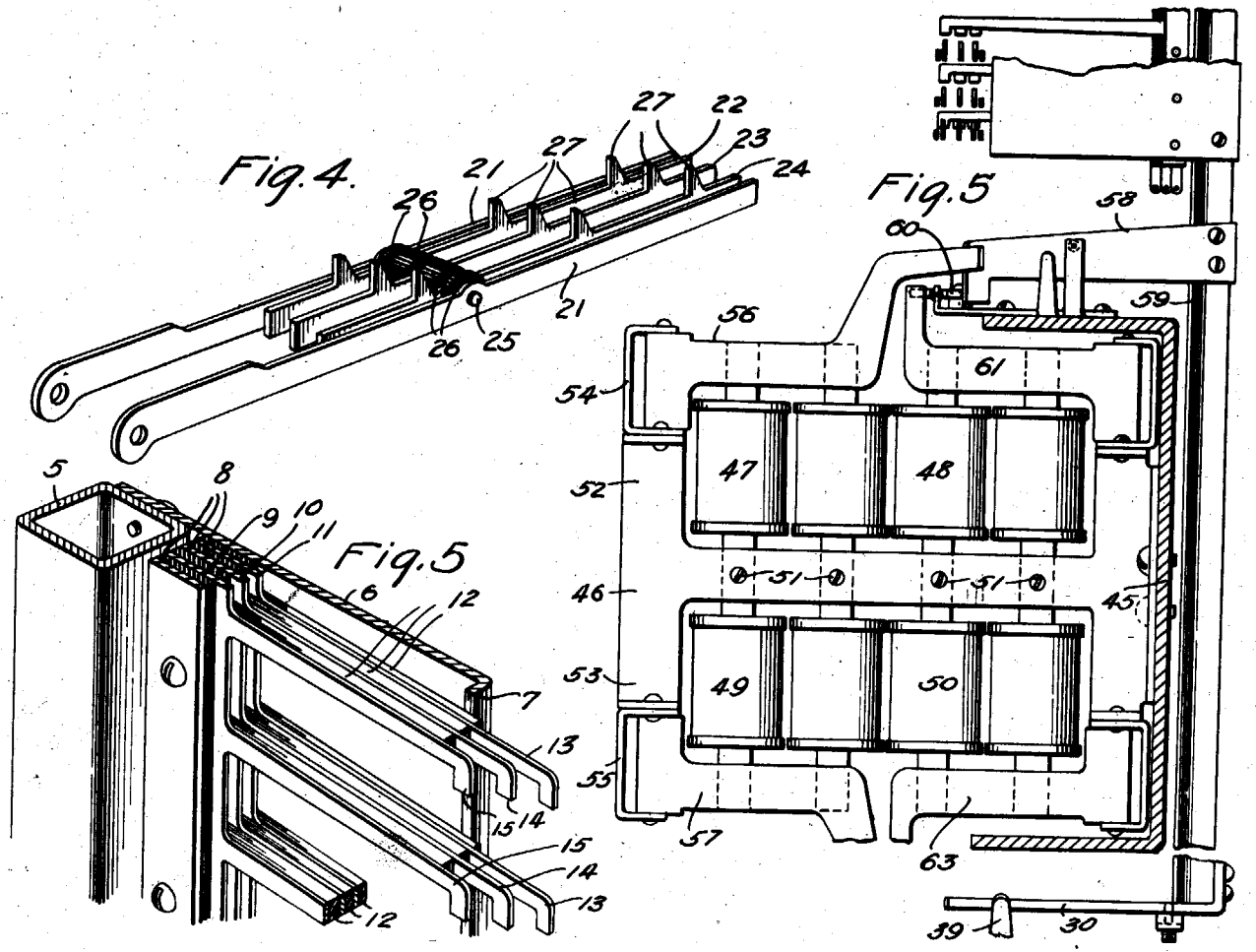
Inventor.
John Newberry Reynolds
by J. G. Roberts
Att'y.

Reissued July 10, 1923. Re. 15,644

UNITED STATES PATENT OFFICE.

JOHN N. REYNOLDS, OF GREENWICH, CONNECTICUT, ASSIGNOR TO WESTERN ELECTRIC COMPANY, INCORPORATED, OF NEW YORK, N. Y., A CORPORATION OF NEW YORK.

LINE SWITCH.

Original No. 1,306,124, dated June 10, 1919, Serial No. 127,944, filed October 26, 1916. Application for reissue filed June 7, 1921. Serial No. 475,827.

*To all whom it may concern:*

Be it known that I, JOHN NEWBERRY REYNOLDS, a citizen of the United States, residing at Greenwich, in the county of Fairfield and State of Connecticut, have invented certain new and useful Improvements in Line Switches, of which the following is a full, clear, concise, and exact description.

This invention relates to telephone switching mechanism, and more particularly to the mechanical construction and assembly of a crossbar switch such as is shown and described in Reissue Patent 14,236, to J. N. Reynolds, dated December 26, 1916.

The objects of this invention in general are to improve the operation and simplify the mechanical construction and details of the mounting of parts, whereby a simple, compact and rigid structure with the minimum number of parts all easily accessible for replacements and repairs is provided.

One of the features of this invention relates to the method of operation of the line bars, whereby they may be moved into engagement with the trunk bars at a maximum of speed with a minimum distance of actual displacement. According to this feature of the invention, the line bars are pivotally mounted upon trunnions, in such a manner that upon energization of their respective operating magnets, said line bars are caused to move bodily upon the arc of a small circle into engagement with the contacts of preselected trunk bars.

Another feature of this invention relates to the construction of the line bars, whereby a light and rigid structure of few and simple parts is easily produced.

Other features of this invention relate to the mounting and assembly of the parts whereby either the line or trunk bars can be easily removed without interference, the details of the spring assembly of the trunk bars whereby firmly alined and uniformly tensioned contacts are provided, the mounting of the trunk bar operating magnets whereby the distortional effect resulting from the turning of the trunk bars is reduced to a minimum; and other details of construction and combination of parts whereby a simple and efficient structure is produced.

Figure 1:
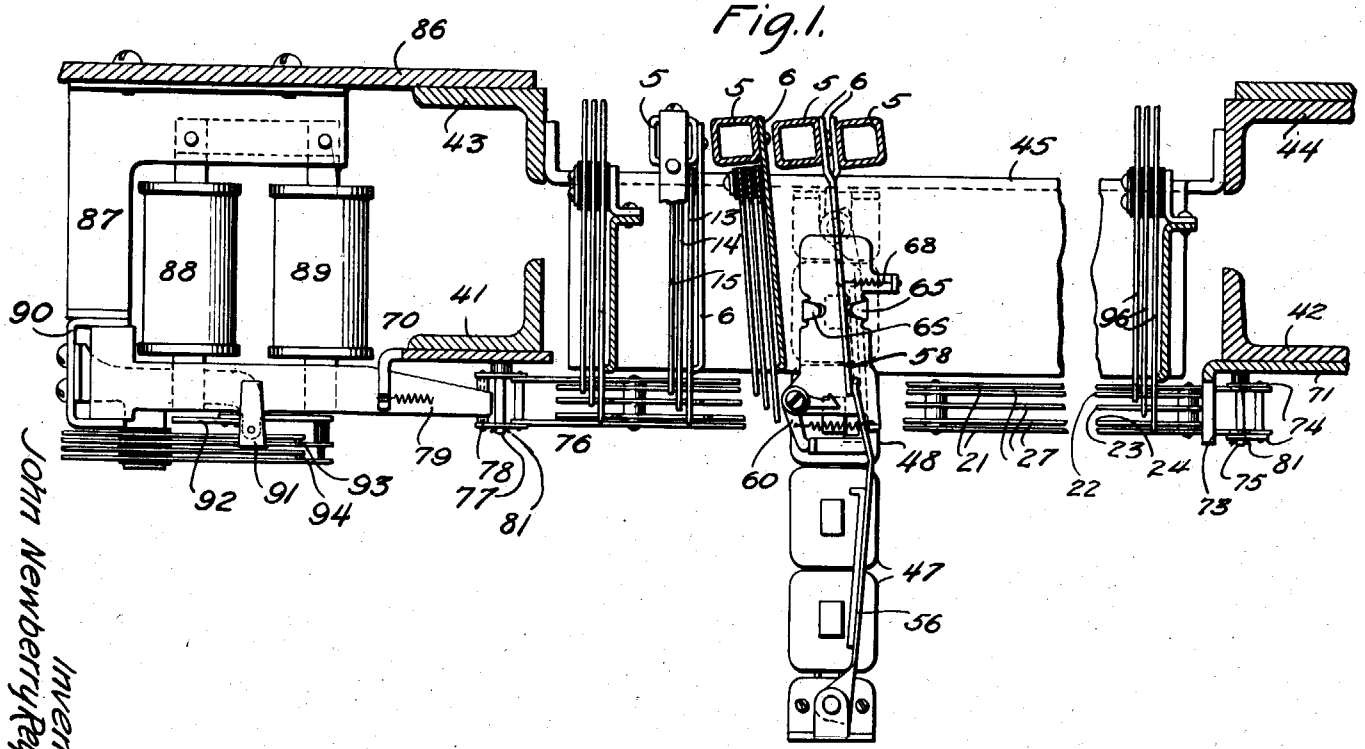
Figures 2, 6:
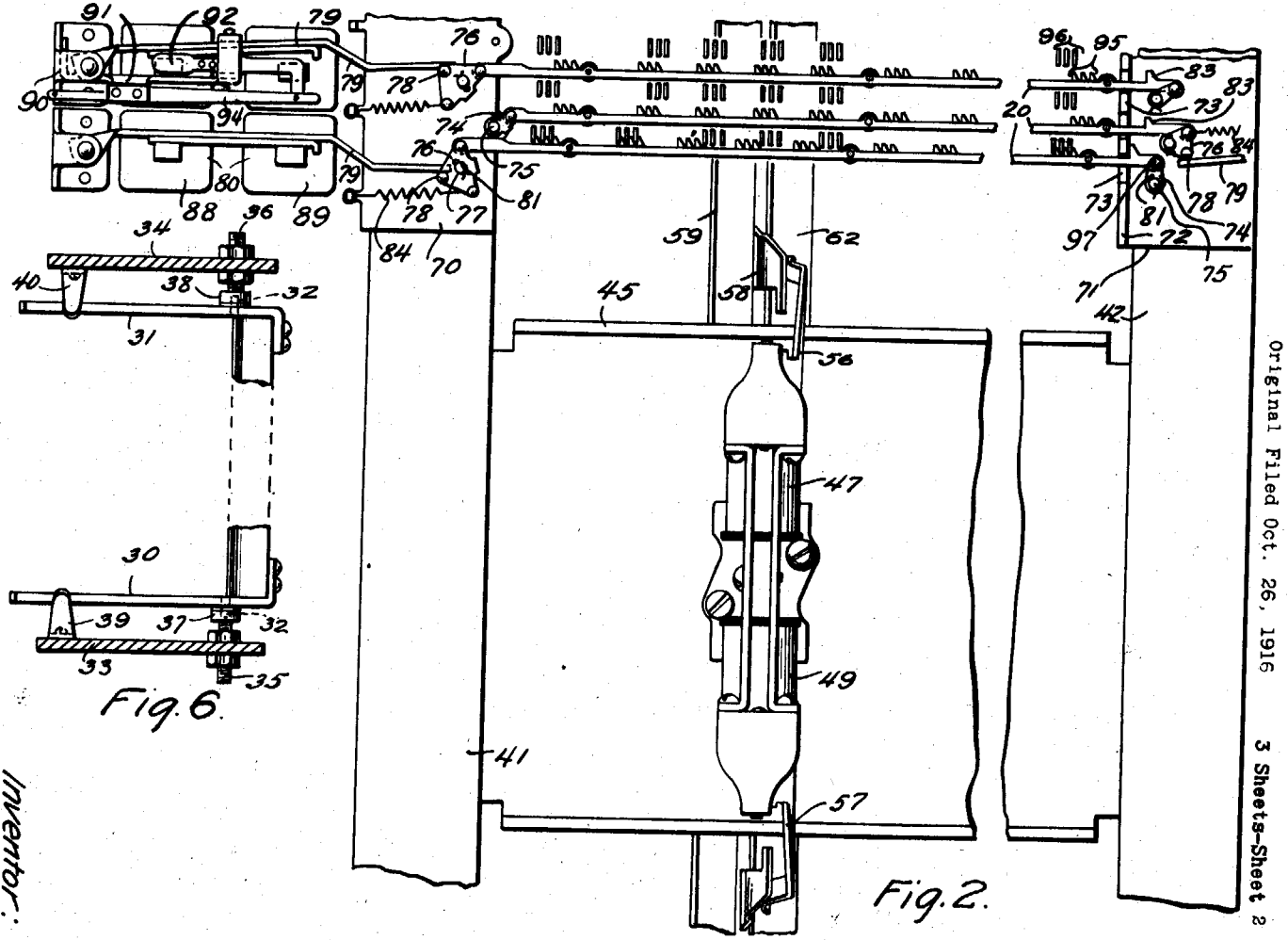

In the drawings, Figure 1 is a horizontal cross-sectional view of a structure embodying the features of this invention; Fig. 2 is a view in front elevation with parts broken away of a structure embodying the features of this invention; Fig. 3 shows an end elevation with parts in section of the structure of Fig. 2; Fig. 4 is a perspective of a portion of one of the line bars showing its construction; Fig. 5 is a perspective view with parts in section showing the construction of a trunk bar and method of mounting the contacts thereon; and Fig. 6 is a detail sectional view with parts broken away showing the method of mounting the trunk bars.

In general the switch to which this invention relates is one in which bars carrying trunk terminals are pivotally mounted in a manner to be angularly displaced, in order to bring the terminals thereon into a position to be engaged by terminals of a line bar which is mounted at right angles to the trunk bar, and is adapted to be moved into position where its terminals will engage the terminals of the trunk bar and remain in engagement therewith during the time that the line is in use. The engagement between one set of line terminals and a set of trunk terminals causes the release of a trunk bar, whereupon all other terminals on said trunk bar except the set in use are returned to a position where they cannot be engaged by subsequently operated line bars.

Each of the trunk bars comprises a tubular member 5 to one side of which is firmly secured a terminal supporting plate 6. The terminal supporting plate 6 extends outwardly from the tubular member 5, and is provided at its outer margin with a turned-over portion 7. Secured to the plate 6 adjacent to the tubular member 5 are strips of insulation 8, 8 alternated with strips 9, 10 and 11 of conducting material. Extending from each of the strips of insulation 8, 8 are a plurality of arms 12, 12 which project slightly beyond the turned-over portion 7 of the terminal supporting plate 6. Extending from each of the strips 9, 10 and 11 of conducting material are a plurality of spring arms 13, 13, 14, 14, and 15, 15 respectively, each of said arms being provided at its outer end with a bent-over portion with which the terminals of the line bars are adapted to engage. The spring arms 13, 13 are longer than the arms 14, 14 and the latter are longer than 15, 15. The strips 8, 8 of insulation and 9, 10 and 11 of conducting material are clamped tightly against the flat surface of the plate 6 by means of screws, while the turned-over portion 7 of said plate engages the projecting arms 12, 12 of the inner strip of insulating material 8. The pressure exerted upon the ends of these arms 12, 12, 13, 13, 14, 14 and 15, 15 by the turned-over portion 7, when the strips 8, 8 and 9, 10 and 11 are tightly clamped against the plate 6, gives a uniform tension to all of the spring arms 13, 13, 14, 14 and 15, 15 and maintains them in alinement.

Line bars 20, 20 which are adapted to cooperate with these trunk bars are made in skeletonized form, and each comprises generally a pair of side-supporting members 21, 21, between which are located the current conducting members 22, 23 and 24, the frame members 21, 21 and the conducting strips 22, 23 and 24 are secured together at their ends and between their ends by rivets 25, 25. The conducting strips 22, 23 and 24 are separated from each other and from the frame members 21, 21 by means of insulating washers 26, 26. Formed on each of the conducting strips 22, 23 and 24 are projecting contact members 27, 27. The strips 22, 23 and 24 are so mounted that the projecting contact members 27, 27 forming one set of terminals are slightly staggered with respect to each other; that is, the projecting member 27 on contact strip 22 will be slightly in advance of the corresponding contact member 27 on the strip 23, and the projecting contact member 27 on the strip 23 is slightly in advance of the projecting contact member 27 of the same set on the strip 24. All of the parts of this line bar 20 may be punched from sheet metal, and readily secured together by rivets, thereby forming a light, rigid and economical structure. Each of the tubular members 5 has secured to its ends inwardly projecting arms 30 and 31, each arm having a projecting pivot pin 32. Projecting through top and bottom, horizontal frame members 33 and 34 are pivot screws 35 and 36, upon the ends of which are cupped members 37 and 38, adapted to receive the pivotal pins 32, 32 to pivotally support the trunk bars. The projecting arms 30 and 31 extend inwardly between the arms of pronged members 39 and 40, secured to the inner faces of the frame members 33 and 34, said pronged members serving as stops for limiting the swinging movement of the trunk bars. By loosening the lock nuts and withdrawing the pivot screws 35 and 36, the trunk bars may be removed from the rear of the frame without disturbing any of the other apparatus thereon. The frame member may be supported at the top and bottom of front and rear angle bar frame members 41, 42, 43 and 44.

Secured to the rear frame members 43 and 44 at approximately their center portions is a channeled plate 45, to which is removably secured a magnet supporting plate 46, there being one such frame for each two of the trunk bars. Each of these plates carries two sets of magnets, one set comprising magnets 47 and 48, the other set comprising magnets 49 and 50. The magnets 47 and 49 constitute the setting magnets for adjacent trunk bars, while the magnets 48 and 50 are the corresponding release magnets. The windings of the corresponding magnets are mounted upon common cores, and the magnets are secured in place by means of screws 15, 51 which extend through the plate 46, into engagement with the portions of the cores between the two windings thereon. Secured to opposite arms 52 and 53 of the plate 46 are brackets 54 and 55, in which are mounted armatures 56 and 57, adapted to be attracted by the magnets 47 and 49 respectively. The armature 56, when attracted, is adapted to engage an arm 58 projecting from a trunk bar 59 to displace said trunk bar angularly. A latch member 60, supported upon the channel plate 45, is adapted to retain said trunk bar in its displaced position until released by means of an armature 61 controlled by the magnet 48. Similarly, the magnets 49 and 50 control the setting and release of a trunk bar 62 by their armatures 57 and 63. Guide and stop arms 65 and 66 for the arm 58 are mounted upon the channel plate 45, and serve to maintain the adjustment of the arm 58 and its trunk bar with respect to the operating and release magnets. With such a construction it is possible to remove and replace trunk bars in the manner heretofore described without necessitating a readjustment of the operating or release magnets. Also the group of magnets 47, 48, 49 and 50 may be removed by the simple removal of the plate 46 from the plate 45, and without interference with the trunk bar adjustment.

A spring 68 serves to return the displaced trunk bar to normal position when released by the withdrawal of the latch 60 by the energization of the release magnet.

It will be understood of course that there will be a group of magnets 47, 48, 49 and 50 and corresponding parts for each pair of trunk bars of the switch. Providing this method of mounting the operating and release magnets at the center of the structure not only facilitates the removal and replacement of parts, but since the pressure for operating the trunk bars is applied at a point distant from both ends, the distortional effect of the turning of the trunk bars is much less than it would be if the turning force were applied near either end of the trunk bars.

Mounting plates 70 and 71 for the line bars 20, 20 are secured to the frame members 41 and 42. The plate 71 has a turned-over portion 72, provided with openings 73, 73 through which the bars 20, 20 are movable. At one end each of the line bars 20 is supported by a simple pivoted link 74, one end of which is attached to the end of the line bar, the other end to the plate 70 or 71, as the case may be, by means of a pivot pin 75. At the opposite end of each line bar 20 is a link 76, generally triangular in shape, pivotally supported upon the plate 70 or 71 by means of a pivot pin 77. One corner of the link 76 is attached to the end of the line bar 20, while another corner thereof is provided with a pin 78 adapted to be engaged by an armature 79 of a line magnet 80 to move said bar into engagement with contacts of a displaced trunk bar. Cotter pins 81, 81 are inserted through the outer ends of the pivot pins 75 and 77, to retain said line bars in place and permit of their ready removal. By mounting the line bars on links as described, every point of the bar is moved in response to the energization of its line magnet, on the arc of a circle having a radius equal to the center to center distance between pivot pins 75 and 97.

The frame members 21, 21 of each of the line bars 20 are each provided with an ear or projection 83 thereon, adjacent the end which is supported on the plate 71, which projections are adapted when the line bar is operated to engage the face of the turned-over portion 72, adjacent to the openings therein, to limit the inward movement of the line bars.

Coiled springs 84, 84 are employed for returning the line bars 20, 20 to their normal positions after operation.

Secured to the frame member 43 is a mounting plate 86, upon which is removably mounted a bracket member 87. This bracket member supports two magnet windings 88 and 89 with associated cores. Pivotally supported in a bracket member 90, secured to member 87, is the armature 79, which extends across the faces of the cores of both magnet windings 88 and 89 into operative relation to the line bar 20, as heretofore explained. A second bracket member 91, secured to the bracket 90, carries an armature 92 in position to be attracted by the core of winding 88. The armature 92 controls contact springs 93 and 94, and is responsive only to the energization of winding 88. The armature 79 is responsive to the energization of 88 and 89 together, but to neither alone. 88 may constitute the line relay, and 88 and 89 together the line magnet. There will of course be a line relay and a line magnet for each of the line bars 20, and in order that the line bars may be mounted as closely together as possible for good operation alternate ones may be operated from opposite ends as indicated in Fig. 2. It will be obvious that the arrangement of line relays and line magnets may be duplicated upon the other side of the frame.

In addition to the regular terminals on the line bars 20, each is provided with an extra set of terminals 95 thereon. The terminals of the set 95 are formed in the same manner as the other terminals of the bar but are located near one end of the bar and are adapted to make contact with a set of stationary terminals 96 arranged in the same manner as the terminals on the trunk bars. There is a set of stationary terminals for each line bar and the line conductors are connected with the separate springs thereof, thereby avoiding the use of flexible movable conductors for including the line bars in the circuit.

The operation of the switching mechanism embodying the features of this invention is substantially the same as that of the switch shown and described in the Reissue Patent 14,236, with the exception that in the device illustrated in this specification, the trunk bars are set by individual magnets, whereas in the device of the patent, a common setting means is provided for the trunk bars. Briefly, the operation is as follows: A preselected trunk bar will be set or moved to a displaced position by reason of the energization of its individual setting magnet, and will be locked in such displaced position temporarily. Upon the energization of a line magnet, the corresponding line bar will be moved on the arc of a small circle as previously described, and the contacts 27 thereon corresponding with the displaced trunk bar will be brought into engagement with a set of spring arms 13, 14 and 15 of said trunk bar, and the terminals 95 will be brought into engagement with stationary terminals 96. Upon the engagement of the contacts of an operated line bar with the contacts of a displaced trunk bar, the release magnet is caused to operate to release the trunk bar and permit it to return to normal position with its unengaged contacts out of position to be engaged by the contacts of subsequently operated line bars. The line bar, however, will remain in operated position and the engagement of the contacts of the line and trunk bars will cause the contact arms of the trunk bar to flex slightly out of their normal position, and the pressure will insure good electrical connection between the contacts of the two bars. When the line magnet is deenergized the line bar will be returned to normal position, thus separating the contacts of the two bars.

The specific embodiment of the invention shown in the accompanying drawings and described above, contemplates an arrangement of the line bars and trunk bar contacts, wherein the line bar contacts are normally, vertically and horizontally separated from the trunk bar contacts and wherein a horizontal movement of a set of trunk bar contacts and a movement of the corresponding line bar contacts having both vertical and horizontal components are required to effect a connection therebetween. The scope of the invention, however, is not limited to the specific arrangement shown and described, but only by the appended claims.

What is claimed is:

1. In a switching mechanism, switch bars, cooperating sets of contacts on said bars vertically and horizontally separated from each other, and means for moving one of said bars, bodily, at right angles to and in the direction of its length in a continuous movement upon the arc of a circle.

2. In a switching mechanism, intersecting switch bars, cooperating sets of contacts on said bars vertically and horizontally separated from each other, and means for moving one of said bars, bodily, at right angles to and in the direction of its length in one continuous movement to bring the contacts thereon into engagement with contacts on the other bar.

3. In a switching mechanism for telephone exchanges, line bars, contacts on said line bars, trunk bars, contacts on said trunk bars horizontally and vertically separated from the contacts on said line bars, and means for moving said line bars bodily at right angles to and in the direction of their length in a continuous movement to bring the contacts thereon into engagement with the contacts on said trunk bars.

4. In a switching mechanism, a supporting frame, vertical contact bars supported on said frame, horizontal contact bars, the contacts of said vertical and horizontal bars being vertically and horizontally separated in the normal position of said horizontal bars, means for moving said horizontal bars, and pivotal supporting links for said bars for causing a continuous movement thereof in a horizontal and vertical direction in response to said moving means to bring the terminals thereon into engagement with terminals on said vertical bar.

5. In a switching mechanism for telephone systems, a supporting frame, line switching members mounted upon said frame and removable from the front thereof, and trunk switching members mounted upon said frame and removable from the rear thereof.

6. In a switching mechanism, a switch member comprising a pair of frame members, a plurality of metal conducting strips interposed between said frame members, each of said conducting strips having a plurality of integral laterally extending non-flexible contact lugs disposed at intervals in the direction of its length, insulators interposed between the separate conducting strips and frame members, and means for securing the parts mentioned together.

7. In a switching mechanism for telephone systems, a switching member including a terminal mounting plate, a longitudinal projection on said terminal mounting plate, a plurality of conducting strips insulated from each other, contact arms projecting from each of said strips beyond the longitudinal projection on said terminal mounting plate, and means for clamping said strips against the flat portion of said mounting plate with the contact arms of said strips held under tension by said projection on said plate.

8. In a switching mechanism for telephone systems, a switching member comprising a tubular supporting member, a terminal mounting plate secured at one edge to said tubular supporting member, said plate being provided at its other edge with a turned-over portion, a plurality of conducting strips, contact arms extending from said strips, a plurality of insulating strips adapted to be interposed between said conducting strips, arms extending from said insulating strips, the arms on said insulating strips and the arms on said conducting strips being adapted to coincide when said strips are clamped together, and means for clamping said strips against the flat portion of said terminal mounting plate with the ends of the arms projecting beyond said turned-over portion of said plate whereby said arms are held under tension by said turned-over portion.

9. In a switching mechanism, a skeletonized switch member comprising a pair of frame members, a plurality of conducting strips each having a plurality of contact members thereon, securing means located at separated points for mechanically securing said frame members and said conducting strips together, and means located only at said securing points, for electrically separating said frame member and said conducting strips each from the other, the ends of said switch member being adapted for mounting on pivots extending transversely to the length of said member.

10. In a switching mechanism, a skeletonized switch member comprising a pair of frame members, a plurality of metal conducting strips each having a plurality of contact members formed thereon, rivets inserted through said frame members and conducting strips at a plurality of separated points for mechanically securing said frame members and said contact strips together, and insulating washers interposed between the separate contact strips and the contact strips and frame members and secured by said rivets, said switch member being provided at each of its end portions with a transverse aperture whereby it may be pivotally mounted.

11. In a switching mechanism, a plurality of sets of intersecting movable contact carrying bars, means for moving the bars of the sets for bringing contacts of intersecting bars into engagement, a set of stationary contact members individual to the movable bars of one set, and cooperating contacts on each bar of one set adapted to engage a cooperating set of stationary contact members upon operation of said bars, said sets of cooperating contacts maintaining their engagement while the bars of said last mentioned set are in operated position.

12. In a switching mechanism for telephone systems, a set of movable trunk bars, contacts thereon, a set of movable line bars, contacts on said line bars adapted to be brought into engagement with contacts on said trunk bars in response to the movements of both of said bars, a set of stationary contact members individual to each of said line bars and cooperating contacts on each of said line bars brought into engagement with said stationary contacts upon movement of said line bars, the contacts on said line bars maintaining their engagement with said stationary contacts while the line bars are in operated position.

13. In a switching mechanism, a supporting frame, movable trunk bars mounted on said frame, contacts on said trunk bars, movable line bars mounted on said frame, contacts on said line bars arranged to engage the contacts on said trunk bars, rotatable link members, said line bars being supported at each end on said rotatable link members, means for moving a trunk bar into position to have its contacts engaged by contacts on said line bars, and electromagnets having armatures arranged to engage and operate said link members to displace said line bars vertically and longitudinally in a continuous circular movement.

14. In a switching mechanism, a frame, movable trunk bars mounted on said frame, contacts on said bars, movable line bars mounted on said frame, contacts on said line bars arranged to engage the contacts on said trunk bars, operating magnets for each trunk bar arranged to move said bars into position to cooperate with the line bars, rotatable supporting links, said line bars being supported at each end on said rotatable links, and operating magnets for said line bars arranged to operate said links to move a line bar to engage its contacts with the contacts of a positioned trunk bar, the operating magnets of said trunk bars being arranged to act upon the trunk bars at a point substantially midway the ends thereof.

15. In a switching mechanism, a switch bar, contacts on said switch bar, a line bar, contacts on said line bar, said switch bar contacts and line bar contacts normally disengaged, means for angularly displacing said switch bar contacts from their normal position, and means for moving said line bars bodily on the arc of a circle to effect engagement between said line bar contacts and said switch bar contacts when the latter are displaced.

16. In a switching mechanism, rotatable trunk bars, contacts on said trunk bars, line bars, contacts on said line bars, link members on which said line bars are mounted and whereby said line bars are adapted to move bodily on the arc of a circle, means for rotating said trunk bars to position the contacts thereon into the path of line bar contacts, and means for moving said line bars bodily on the arc of a circle to effect engagement between contacts thereon and trunk bar contacts.

17. In a switching mechanism, rotatable trunk bars, contacts on said trunk bars, line bars, contacts on said line bars for cooperating with said trunk bar contacts, means for rotating said trunk bars for positioning the contacts thereon into engageable relation with line bar contacts and means for moving said line bars, bodily, in the direction of their length and toward said trunk bar contacts in a continuous movement upon the arc of a circle to effect engagement between said trunk bar contacts and line bar contacts.

In witness whereof, I hereunto subscribe my name this 1st day of June, A. D. 1921.

JOHN N. REYNOLDS.